United States Patent [19]

Hazel et al.

[11] Patent Number: 4,888,759
[45] Date of Patent: * Dec. 19, 1989

[54] LASER OPTICAL MEMORY SYSTEM HAVING BEAM COMBINING AND SEPARATING APPARATUS FOR COMBINING AND SEPARATING READING AND WRITING LASER BEAMS

[75] Inventors: Robert L. Hazel, Thousand Oaks; Gilbert Y. H. Chan, Agoura, both of Calif.

[73] Assignee: Burroughs Corporation, Arlington, Va.

[*] Notice: The portion of the term of this patent subsequent to Dec. 31, 2002 has been disclaimed.

[21] Appl. No.: 416,417

[22] Filed: Sep. 9, 1982

[51] Int. Cl.[4] ............................................. G11B 7/00
[52] U.S. Cl. ................................ 369/110; 369/112; 250/201
[58] Field of Search .................. 369/110, 112, 109; 358/342; 250/201, 202; 350/163, 171, 172, 174

[56]  References Cited

U.S. PATENT DOCUMENTS

| | | | |
|---|---|---|---|
| 3,925,603 | 12/1975 | Naruse et al. | 369/45 |
| 4,041,530 | 8/1977 | Kramer et al. | 369/109 X |
| 4,085,423 | 4/1978 | Tsunola et al. | 369/45 |
| 4,160,269 | 7/1979 | Kramer et al. | 369/122 X |
| 4,290,122 | 9/1981 | Bates et al. | 369/45 |
| 4,334,300 | 6/1982 | Arquie et al. | 369/122 X |
| 4,344,164 | 8/1982 | Bricot et al. | 369/110 X |
| 4,399,529 | 8/1983 | Leterme et al. | 369/110 |
| 4,402,061 | 8/1983 | Hazel et al. | 369/46 X |
| 4,417,330 | 11/1983 | Hazel et al. | 369/45 X |
| 4,562,568 | 12/1985 | Hazel et al. | 369/112 |

OTHER PUBLICATIONS

Makosch et al.; "Interferometric method for step height measurements on surfaces with variable title"; IBM Tech Disclosure Bulletin, vol. 23, No. 4, Sept. 1980, pp. 1485–1486.

Primary Examiner—Aristotelis M. Psitos
Attorney, Agent, or Firm—Nathan Cass

[57]  ABSTRACT

An optical memory system is disclosed employing laser beams for reading and writing data in an optical disk. The system incorporates a specially designed spatial combining and separating device which functions to combine a writing laser beam with a plurality of reading laser beams in a manner so as to permit the combined beams to be precisely focused on the disk. The spatial combining and separating device also functions to separate the reading laser beams from the writing laser beam after they are reflected from the disk in a manner so as to prevent the higher intensity writing beam from interfering with the proper detection of the lower intensity reading beams.

17 Claims, 9 Drawing Sheets

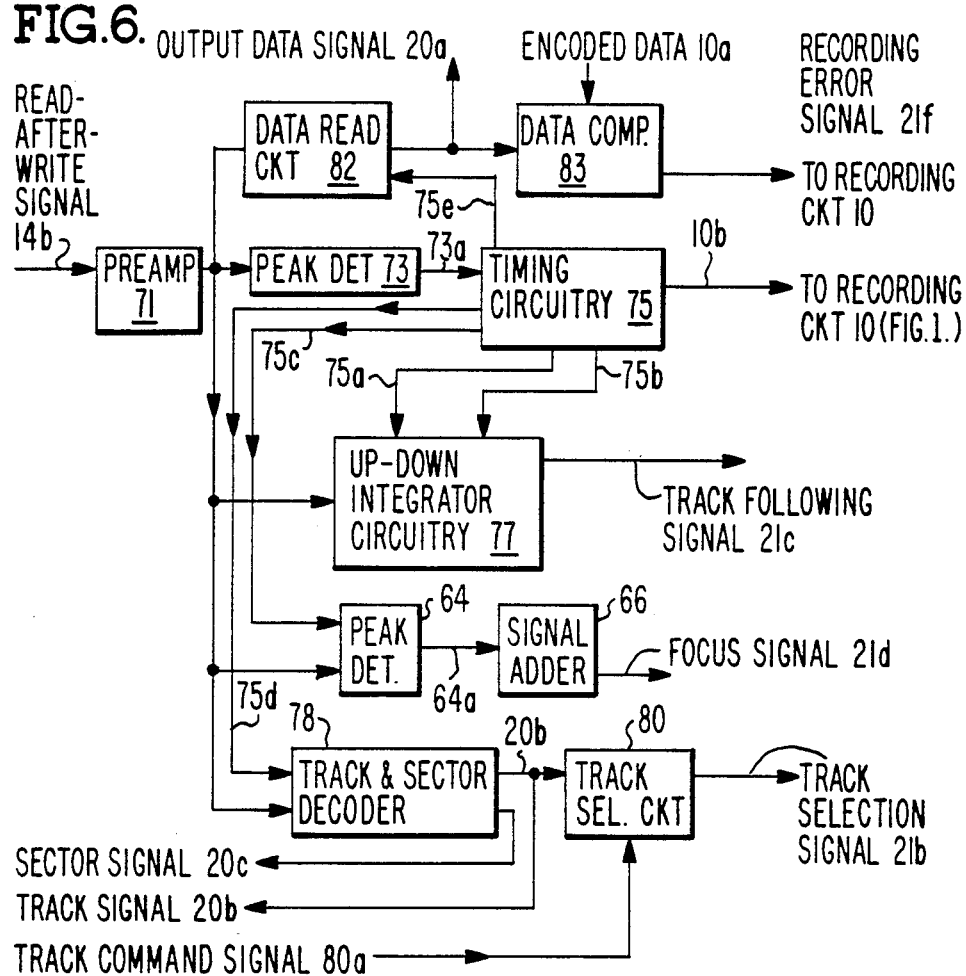
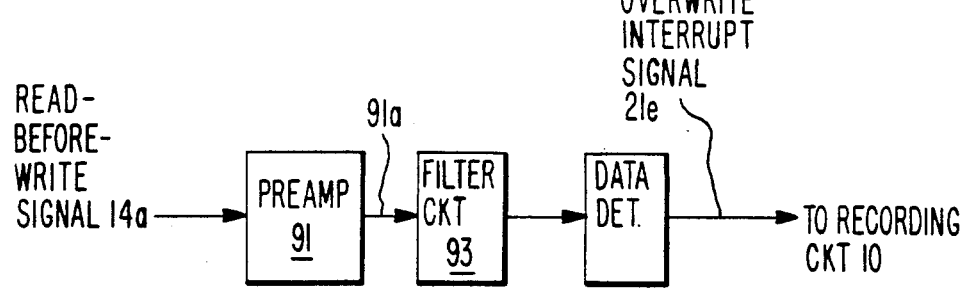
FIG. 6.

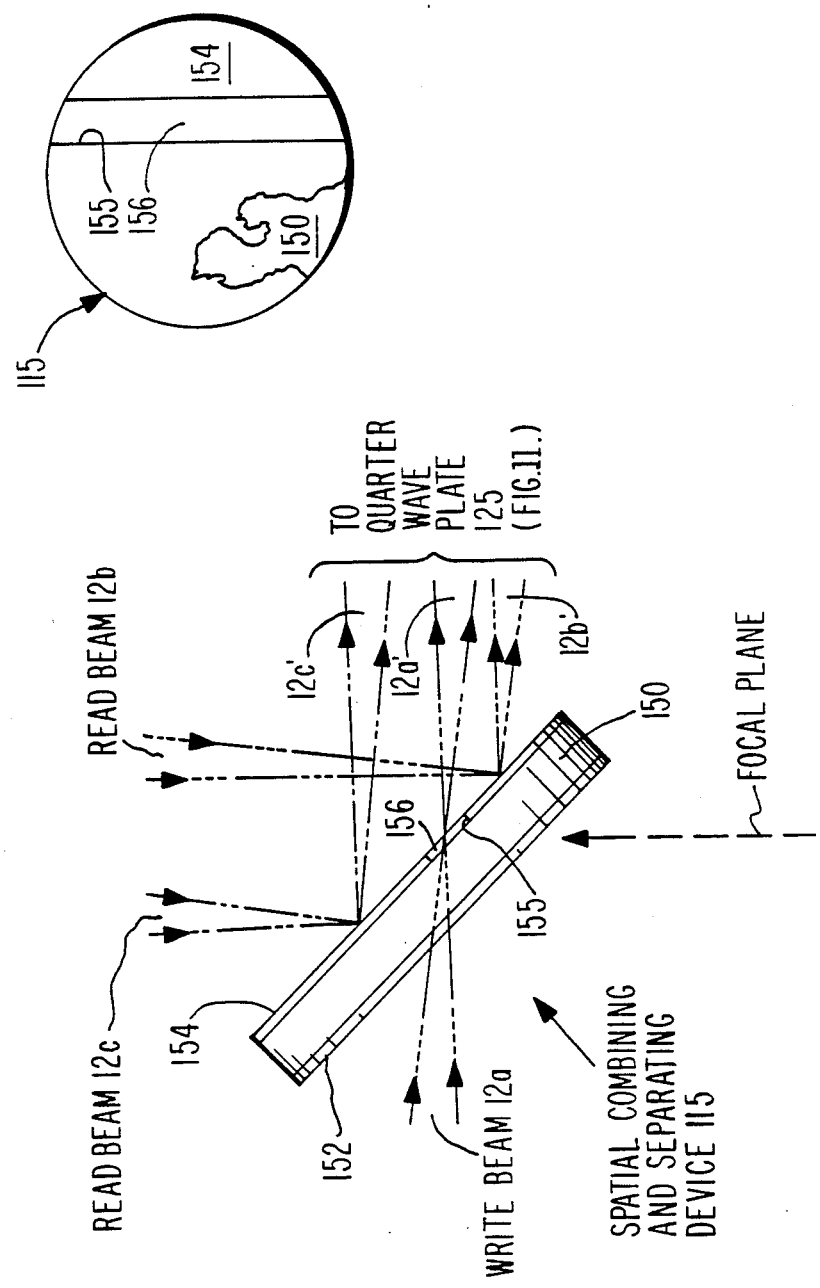

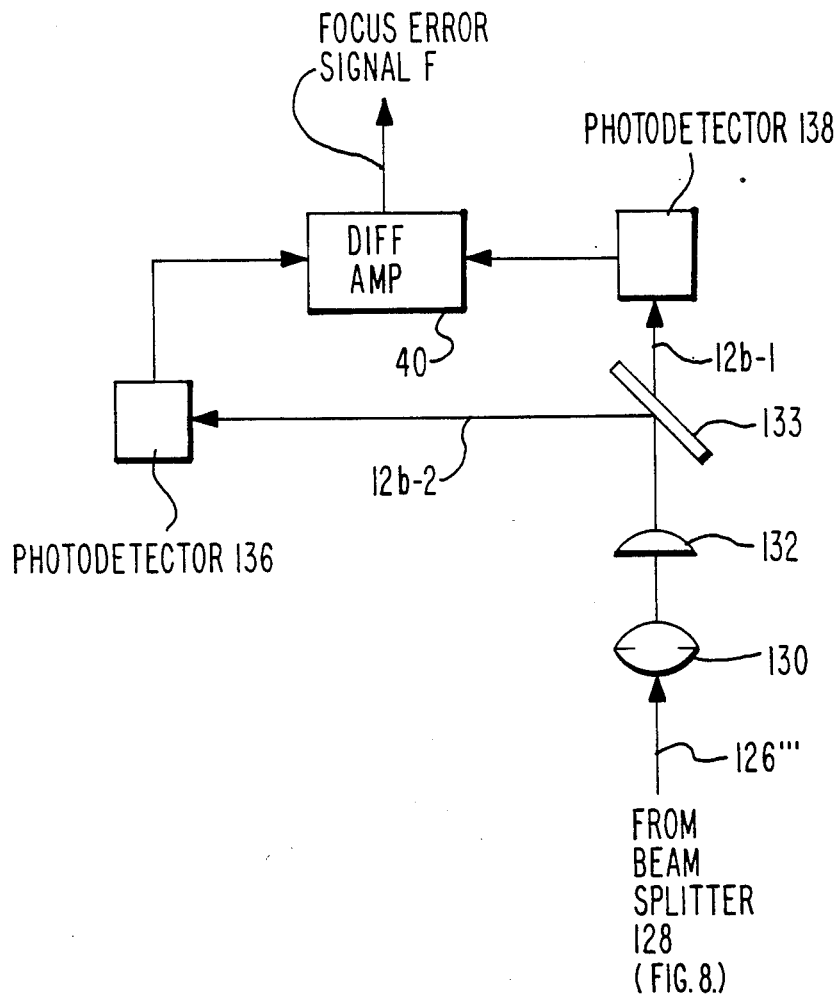

FIG.12.
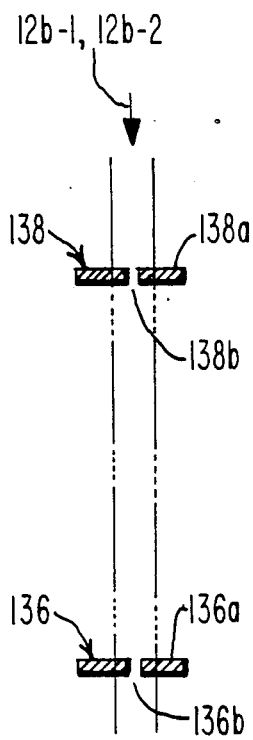
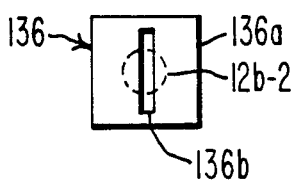
FIG.13.
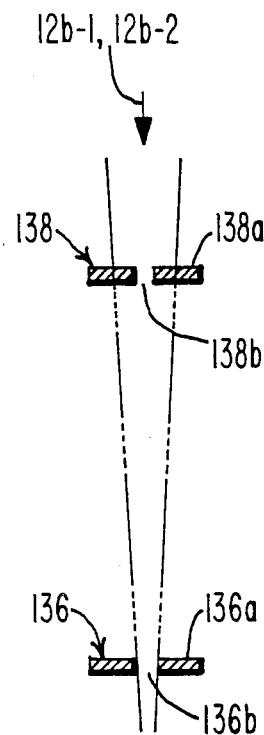
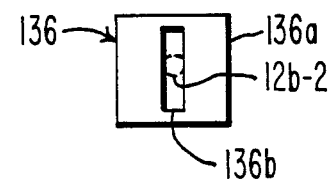
FIG.14.
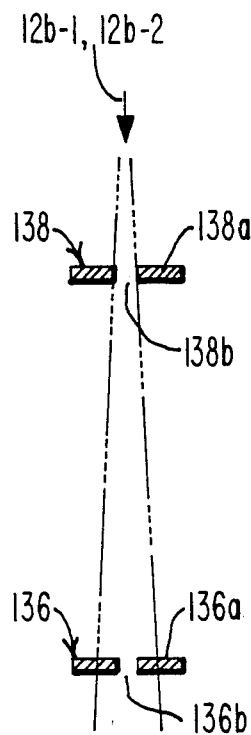
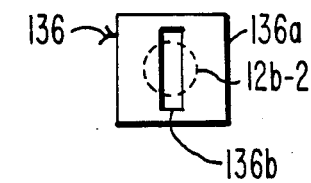

LASER OPTICAL MEMORY SYSTEM HAVING BEAM COMBINING AND SEPARATING APPARATUS FOR COMBINING AND SEPARATING READING AND WRITING LASER BEAMS

CROSS REFERENCE TO RELATED PATENT APPLICATIONS

This patent application contains subject matter related to our commonly assigned patent applications Ser. No. 311,629, filed Oct. 15, 1981 now U.S. Pat. No. 3,116,29; Ser. No. 332,500, filed Dec. 21, 1981 now U.S. Pat. No. 4,556,964; and Ser. No. 379,979, filed May 19, 1982 now abandoned; and also to Ser. No. 416,416; now U.S. Pat. No. 4,559,622, Ser. No. 416,419 now U.S. Pat. No. 4,622,659; Ser. No. 416,420 now U.S. Pat. No. 4,562,568; and Ser. No. 416,770, now U.S. Pat. No. 4,621,353, all filed concurrently herewith.

BACKGROUND OF THE INVENTION

The present invention relates generally to improved methods and/or apparatus for recording and/or reading data in a high density optical data storage system.

In recent years considerable effort has been expended to develop improved methods and apparatus for optically recording and reading on a suitable medium because of the unusually high recording density potential offered by optical recording. Examples of various known methods and approaches are revealed in the following references:

| U.S. PAT. DOCUMENTS | | |
| --- | --- | --- |
| U.S. Pat. No. | Date Issued | Inventor(s) |
| 4,216,501 | 8/5/80 | Bell |
| 4,219,848 | | |
| 4,222,071 | 9/9/80 | Bell, et al. |
| 4,232,337 | 12/4/80 | Winslow, et al. |
| 4,243,848 | 1/6/81 | Utsumi |
| 4,243,850 | 1/6/81 | Edwards |
| 4,253,019 | 2/24/81 | Opheij |
| 4,253,723 | 3/3/81 | Kojima, et al. |
| 4,253,734 | 3/3/81 | Komurasaki |
| 4,268,745 | 5/19/81 | Okano |
| 4,287,413 | 9/1/81 | Kanamaru |
| 4,290,132 | 9/15/81 | Kotaka |

R. A. Bartolini, et al., "Optical Disk Systems Emerge", IEEE Spectrum, August 1978, pp. 20–28.

G. C. Kenney, et al., "An Optical Disk Replaces 25 Mag Tapes", IEEE Spectrum, February 1979, pp. 33–38.

K. Bulthuis, et al., "Ten Billion Bits on a Disk", IEEE Spectrum, August 1979, pp. 26–33.

A. E. Bell, et al., "Antireflection Structures for Optical Recording", IEEE Journal of Quantum Electronics, Vol. QE-14, No. 7, July 1978, pp. 487–495.

The pertinent portions of these references and the aforementioned patent applications are to be considered as incorporated herein.

SUMMARY OF THE PRESENT INVENTION

As is well recognized, it is of considerable importance in an optical memory system that reliable and accurate positioning and focusing control be provided during recording and reproducing operations. Such requirements are particularly severe in an optical memory system because of the very high data recording density typically employed, as compared, for example, to magnetic memory disk systems which store data at a relatively much lower density.

The broad object of the present invention is to provide improvements in the optical systems and devices employed in a high density optical data storage system.

A more specific object of the present invention is to provide an optical storage system incorporating novel apparatus and methods for combining and separating the read and write beams employed in the system.

In a particular preferred embodiment of the present invention, an optical storage system employing reading and writing laser beams incorporates a specially designed spatial combining and separating device (1) for combining a laser writing beam with a plurality of read beams prior to the beams being focused on an optical disk so as to permit the beams to be precisely located on the disk relative to one another; and (2) for separating the laser read and write beams after reflection of the beams from the optical disk so as to prevent interference of the higher intensity write beam with the proper detection of the reflected read beams.

The specific nature of the invention as well as other objects, advantages, features and uses of the invention will become evident from the following description of a preferred embodiment taken in conjunction with the accompanying drawings.

BRIEF DESCRIPTION OF THE DRAWINGS

FIG. 6 is a block electrical diagram illustrating a preferred implementation of the signal processing electronics of FIG. 1.

FIGS. 9 and 10 are side and plan views, respectively, of the spatial combining and separating device 115 shown in FIG. 8.

FIG. 11 is a schematic illustration showing details of the focus detector 47 in FIG. 3.

FIGS. 12–14 are schematic diagrams illustrating the operation of the focus detector 47 shown in FIG. 11.

DETAILED DESCRIPTION OF THE INVENTION

Like numerals and characters designate like elements throughout the figures of the drawings.

Figure 1:
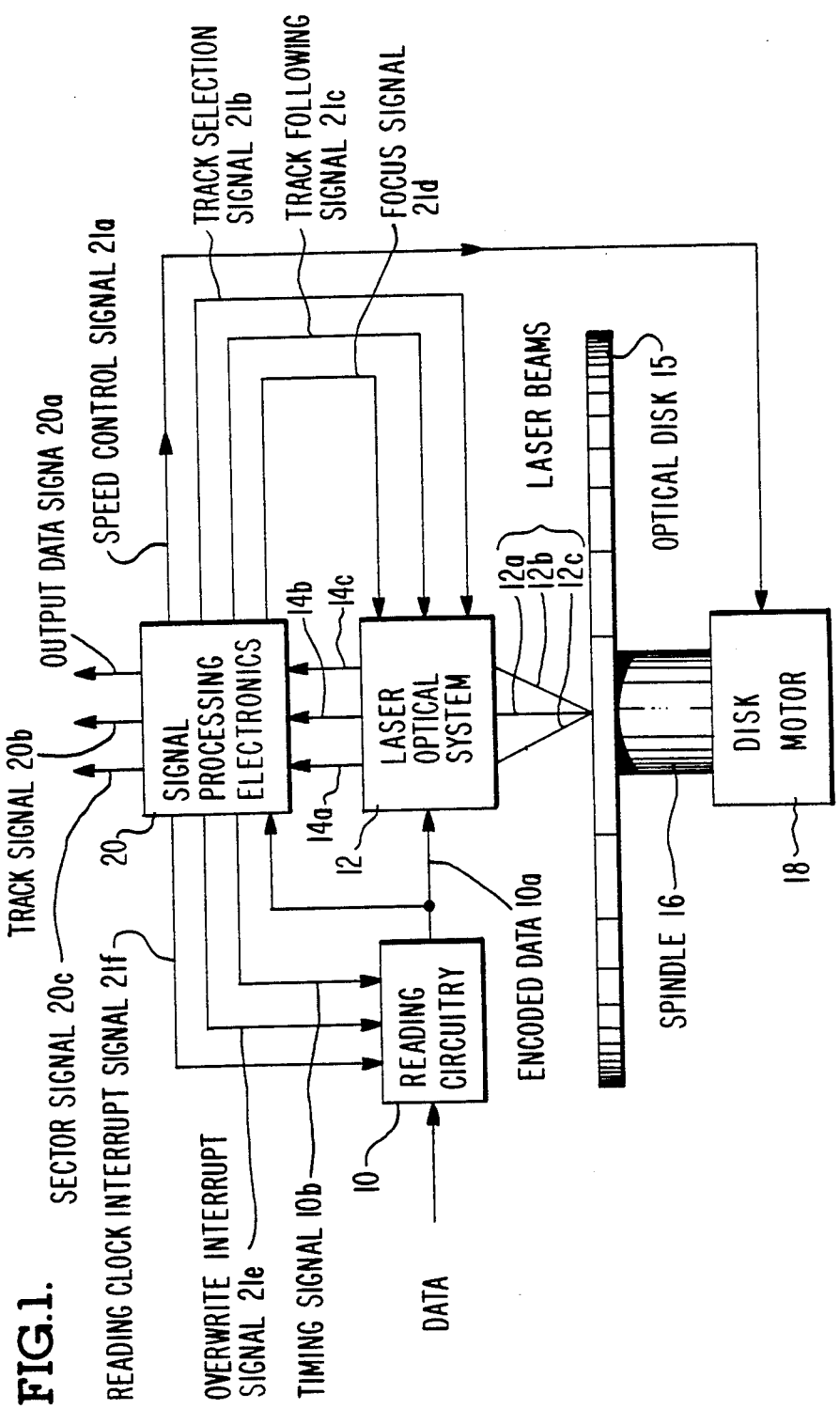
FIG. 1 is an overall block diagram of an optical recording and reproducing system in which the present invention may be incorporated.

Reference is initially directed to FIG. 1, which generally illustrates the basic portions of the embodiment of an optical recording and reading system disclosed in the aforementioned commonly assigned copending patent applications. The data to be recorded is first applied to recording circuitry 10 which encodes the applied data using, for example, a conventional encoding format of the type employed for magnetic recording, such as non-return-to-zero, return-to-zero, etc. Conventional error checking may also be provided for the encoded signal.

The encoded data 10a from the recording circuitry 10 is applied to a laser optical system 12. The laser optical system 12 generates three laser beams 12a, 12b and 12c which are focused at spaced locations along the center line of the same selected track of a preformatted optical disk 15 supported on a precision spindle 16 for rotation by a motor 18. The optical disk 15 may, for example, be a trilayer disk of the type disclosed in the aforementioned U.S. Pat. No. 4,222,071 and in the aforementioned article by Bell, et al. Each laser beam may, for example, be focused to a one micron spot size on the disk 15.

Laser beam 12a is a writing beam which is modulated by the encoded data so as to form optically detectable changes in a selected track of the optical disk 15 representative of the encoded data. It is to be understood that the optically detectable changes produced in the disk by the write laser beam 12a need not be physical changes, such as pits or physical holes. The only requirement is that optically detectable changes be produced in selected areas of the disk in response to the write laser beam 12a which are representative of the encoded data 10a. For the purpose of this description, all of the possible types of optically detectable changes that can be produced will hereinafter be referred to as optical holes.

Laser beams 12b and 12c shown in FIG. 1 are reading beams. As typically illustrated in FIG. 2, the reading beam 12b is a read-after-write beam which is accordingly focused behind the writing beam 12a on the center line 17a of a selected track 17, while the reading beam 12b is a read-before-write beam and is accordingly focused ahead of the writing beam 12a. The intensity of the read beams 12b and 12c are chosen so that they will not disturb the integrity of previously recorded information. The read beams are reflected from the disk 15 back to the optical system 12 which, in response thereto, derives a plurality of detection signals 14a, 14b and 14c which are applied to signal processing electronics 20. The signal processing electronics 20 also receives the encoded data signal 10a from the recording circuitry 10 for use in checking the accuracy of recorded data, as will hereinafter be considered.

The signal processing electronics 20 uses the detected signals 14a, 14b and 14c to provide an output data signal 20a corresponding to data read from the optical disk 15, along with signals 20b and 20c respectively identifying the track and sector locations on the disk from which the data is read. The signal processing electronics 20 also produces control signals 10b, 21a, 21b, 21c, 21d, 21e and 21f. More specifically, control signal 10b is applied to the recording circuitry 10 for synchronizing the encoding of data with disk rotation; control signal 21a is applied to the optical disk motor 18 to provide accurate speed control during recording and reading; control signal 21b is applied to the laser optical system 12 for controlling the radial position of the laser beams 12a, 12b and 12c for the purpose of selecting a desired track; control signal 21c is applied to the laser optical system 12 for providing precise track following of the laser beams on the selected track; control signal 21d is applied to the laser optical system 12 for providing precise focusing of the laser beams 12a, 12b and 12c; control signal 21e is applied to the recording circuitry 10 for interrupting recording if the reflected read-before-write beam indicates the possibility of an overwrite recording error because the track ahead contains previously recorded data; and signal 21f is applied to the recording circuitry 10 to interrupt recording if a recording error occurs.

Figure 3:
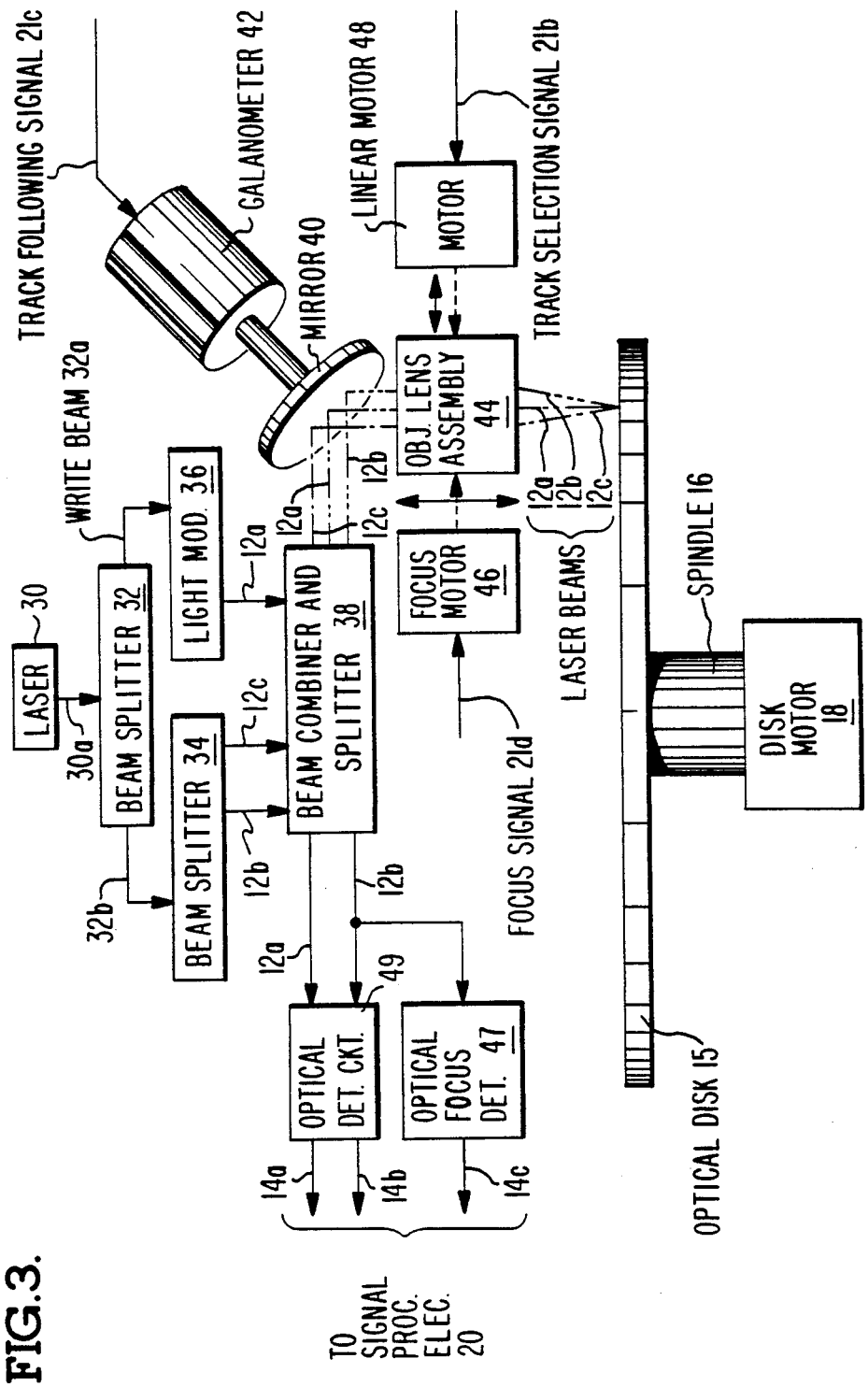
FIG. 3 is a block and schematic representation of the laser optical system shown in FIG. 1.

Reference is next directed to FIG. 3 which illustrates details of the laser optical system 12 generally shown in FIG. 1. The various components of this laser optical system are illustrated in block and schematic form in FIG. 3 since their implementation can readily be provided by those skilled in the art, as will be evident from the aforementioned references.

As shown in FIG. 3, a laser 30 provides a beam 30a having a wavelength of, for example, 633 nanometers and a power level of, for example, 12 mw. This laser beam 30a is applied to a first beam splitter 32 which splits the beam into a high power beam 32a and a low power beam 32b. The low power beam 32b is applied to a second beam splitter 34 which further splits the beam 32b to provide read-after-write and read-before-write beams 12b and 12c, respectively. It is to be understood that a separate laser could be employed for providing one or more of the above beams if so desired.

The high power beam 32a in FIG. 3 is applied to a high speed light-modulator 36 which modulates the beam 32a in response to the encoded data 10a provided at the output from the recording circuitry 10 in FIG. 1. This light-modulator 36 may, for example, be an acous-to-optical digital modulator. The resulting modulated high power beam at the output of the modulator 36 is used as the write beam 12a of the system and is applied to a beam combiner and splitter 38 along with the read beams 12b and 12c which combines the beams taking into account their previously described spacing along the selected track of the disk 15 as typically illustrated in FIG. 2. The resulting three laser beams 12a, 12b and 12c are then reflected off of a mirror 40 mounted to a galvanometer 42. The galvanometer 42 is responsive to the control signal 21c from the signal processing electronics 20 (FIG. 1) so as to cause the mirror 40 to be appropriately deflected as required during track following and seeking operations.

After reflection from the mirror 40, the laser beams 12a, 12b and 12c are then directed to an objective lens assembly 44 mounted on a focusing motor 46. The motor 46 operates in response to the control signal 21d from the signal processing electronics 20 in FIG. 1 to move the objective lens assembly 44 towards and away from the disk 15 so as to thereby maintain accurate focusing of the beams 12a, 12b and 12c on a selected track of the disk. Track selection is provided by controlling the radial position of the beams 12a, 12b and 12c relative to the disk. This is accomplished using a linear motor 48 coupled to the objective lens assembly 44 and responsive to the control signal 21b from the signal processing electronics 20 in FIG. 1.

It will be understood that the two read beams 12b and 12c shown in FIG. 3 are reflected from the disk 15 with a reflected power which is modulated in accordance with the recorded pattern over which the beams pass. The reflected read beams 12b and 12c pass back to the beam combiner and splitter 38 via the objective lens assembly 44 and the galvanometer mirror 40. The beam combiner and splitter 38 directs the reflected beams to optical detection circuitry 49 which converts the beams into corresponding read-after-write and read-beforewrite analog electrical signals 14a and 14b which are applied to the signal processing electronics 20 as shown in FIG. 1. Also, at least one of the reflected read beams 12a and 12b is applied to a geometric optical focus detector 47 which provides a relatively low gain, wide capture range signal 14c to the signal processing electronics 20 which is indicative of the quality of focusing of the beams on the selected track.

Next to be considered is the preformatting provided for the optical disk 15 in FIG. 1. An example of a typical preformatting arrangement is illustrated in FIGS. 4 and 5.

Figure 4:
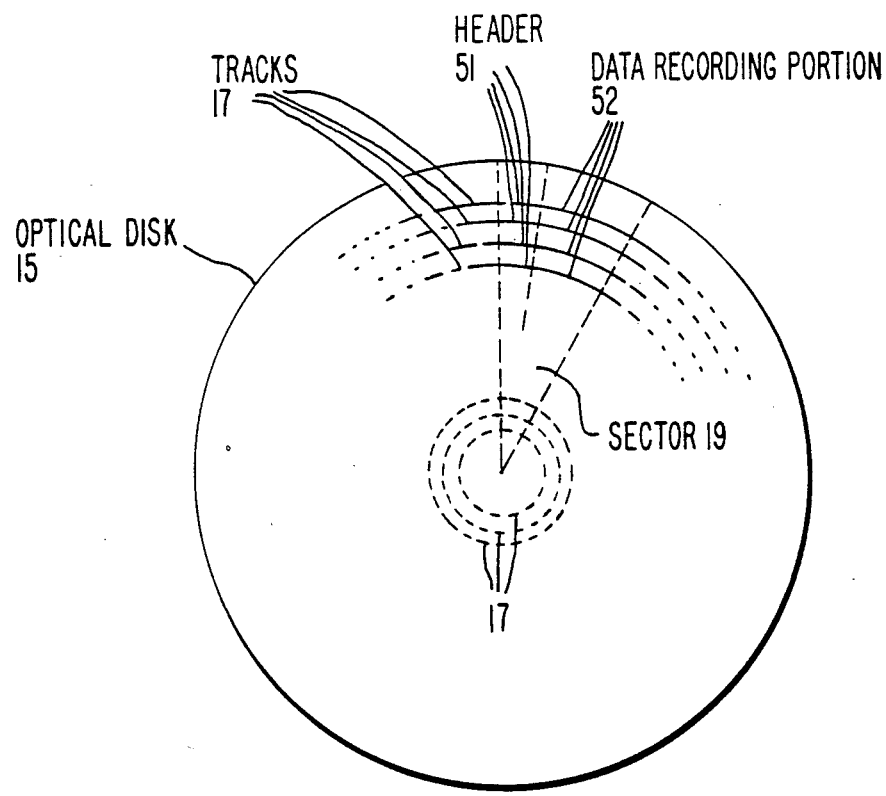
FIG. 4 is a schematic diagram generally illustrating the arrangement and formatting of data on the optical disk.

As generally indicated in FIG. 4, the optical disk 15 in the preferred embodiment being described contains a large plurality of circumferential tracks 17, for example, 40,000 tracks spaced two microns apart on a 14-inch disk. The disk 15 is also divided into a plurality of sectors 19. As indicated in FIG. 4, each track 17 within a sector 19 comprises a header 51 and a data recording portion 52. The data recording portion 52 is the portion into which data is written during recording and comprises the greater portion of the track length within each sector 19. The header 51 of a track 17 is encountered first in each sector 19 and is provided on the disk prior to recording. A disk provided with such headers 51 is typically referred to as being preformatted.

Figure 5:
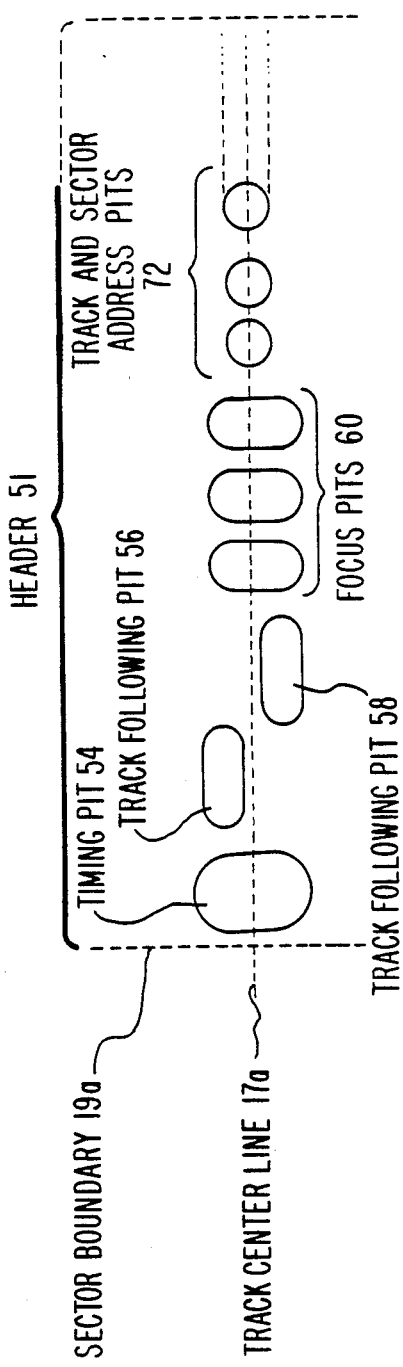
FIG. 5 is a schematic diagram illustrating details of the header formatting shown in FIG. 4.

FIG. 5 illustrates an example of a preformatted header 51 provided for each track 17 in each sector 19 of the disk 15 of FIG. 3. Although the optical holes constituting the header 51 need not be physically observable, as mentioned previously, it will be assumed for the purposes of this description that physical holes, such as pits, are employed for the exemplary header shown in FIG. 4. It will also be assumed that a pit exhibits a relatively high reflectance to an incident beam while other undisturbed disk areas exhibit a relatively low reflectance. It is to be understood that an arrangement may also be employed in which a portion of the optical recording is provided using physical holes, such as pits, and the remaining recorded portions are recorded using optical holes.

Figure 7:
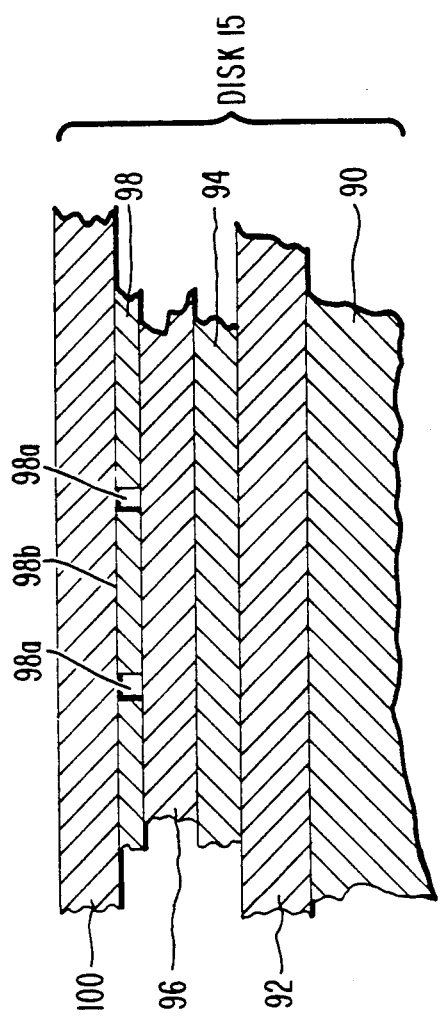
FIG. 7 is a cross-sectional view illustrating the construction of an optical disk employed in the system of FIG. 1.

Before continuing with the description of the header shown in FIG. 5, reference is directed to FIG. 7 which illustrates a cross-section of a disk 15 which may be employed in the system of FIG. 1. A supporting substrate 90 such as a 0.1 to 0.3 inch thick disk of aluminum is coated with an organic smoothing layer 92 of, for example, 20-60 microns prior to deposition thereon of a highly reflective opaque layer 94 of aluminum which may, for example, have a thickness of 400-800 Angstroms. An inorganic dielectric layer 96 such as a 800-1200 Angstrom layer of silicon dioxide which is transparent at the laser frequency is deposited over the aluminum reflector layer 94. An absorbing layer 98 which is absorptive at the laser frequency is then deposited over the dielectric layer 96. This absorbing layer 98 may for example be a 50 to 300 Angstrom layer of a metal such as tellurium. Finally, the absorbing layer 98 is overcoated with a protective layer 100, such as a silicon resin having a thickness of, for example, 150 to 500 microns.

Still with reference to FIG. 7, an anti-reflection (dark mirror) condition for a laser beam incident on unrecorded portions of the disk 15 is produced by appropriately choosing the thicknesses and optical characteristics of the layers 94, 96 and 98. Recording on such a disk 15 as illustrated in FIG. 7 is then accomplished by employing an appropriately focused, intensity-modulated recording laser beam (such as laser beam 12a in FIGS. 1 and 2) which records information by forming optically detectable changes, such as pits 98a, in the absorbing layer 98 along a selected track, the spacing and dimensions of these pits 98a being representative of the recorded data. Information is read from the disk 15 using an appropriately focused reading laser beam (such as laser beams 12b and 12c in FIGS. 1 and 2) which is chosen to be of insufficient intensity to affect unrecorded regions 98b of the absorbing layer 98 and has a frequency at which these unrecorded regions 100 exhibit the previously mentioned anti-reflection condition. As a result, the reflected reading beam will be intensity modulated by the pits 98a since the reading beam will experience a relatively high reflection when the beam is incident on a pit 98a, and a relatively low reflection when the reading beam is incident on an unwritten region 98b. It will be understood that dust particles on the upper surface of the protective layer 100 will be far removed from the focal plane of the optical system (that is, they will be out of focus) so as to have a negligible effect on the above described recording and reading operations.

Reference is now directed back to FIG. 5 for a more detailed consideration of the header 51. Since the header 51 is used in conjunction with the signal processing electronics 20 in FIG. 1 to provide for reliable and precise operation of the system, it will be helpful to describe the construction and arrangement of the exemplary header 51 shown in FIG. 5 in conjunction with FIG. 6 which illustrates an implementation of the signal processing electronics 20 generally shown in FIG. 1. The individual components of FIG. 6 can readily be implemented by those skilled in the art and are thus shown in block form.

Referring to the preformatted heading 51 shown in FIG. 5, it will be seen that immediately following the left sector boundary 19a is a relatively large pit 54 providing a relatively large change in optical reflectance which is used to provide synchronized timing for the signal processing electronics 20. This is accomplished by applying the detected read-after-write signal 14a in FIG. 3 to a peak detector 73 via a preamplifier 71. The peak detector 73 outputs a narrow pulse 73a corresponding to the pit 54 which it recognizes as the largest peak in the playback signal. This narrow output pulse 73a produced by the peak detector 73 is then applied as a timing reference to conventional timing circuitry 75 which generates various timing signals 10b, 21a, 75a, 75b, 75c, 75d and 75e for synchronizing the operation of the system with the disk 15. The purposes of these timing signals will become evident as the description proceeds.

Following pit 54 in FIG. 5 are two pits 56 and 58 elongated in a direction parallel to the track 17 and disposed on opposite sides of the track center line 17a in a staggered relationship. These pits 56 and 58 are used to provide precise track following. This is accomplished in FIG. 6 by applying the amplified read-after-write signal provided at the output of the preamplifier 71 to up-down integrator circuitry 77. The up-down integrator circuitry 77 integrates up in response to the detected signal obtained when the read-after-write beam traverses the portion of the track 17 corresponding to the elongated pit 56, and integrates down in response to the signal obtained when the read-after-write beam traverses the portion of the track 17 corresponding to the elongated pit 58. It will be understood that the difference between these two integrations will be a measure of the preciseness of track following by the laser beams. The dimensions and locations of the elongated pits 56 and 58 are chosen in conjunction with the size of the focused beam so that even very small deviations of the beam from the track center line 17a can be detected. This difference provided by integrator circuitry 77 when pits 56 and 58 are traversed during each sector is accordingly used to produce the control signal 21c which is applied to the galvanometer 42 (FIG. 3) to provide for precise following of a selected track by the laser beams.

It will be noted in FIG. 6 that the timing circuitry 75 provides timing signals 75a and 75b to the up-down integrator circuitry 77. The timing signal 75a is used to delineate the particular times during traversal of the header 51 of each sector for which up and down integrations should be performed so as to appropriately correspond with the locations of the elongated pits 56 and 58. The timing signal 75b is provided during each sector to the up-down integrator circuitry 77 to serve as a hold signal to hold until the next sector the resultant integrated value obtained after the read-after-write beam has completed traversing the second elongated pit 58.

Following the elongated pits 56 and 58 in the exemplary header 51 shown in FIG. 5 are a plurality of pits 60 elongated perpendicularly to the track center line 17a. The locations and dimensions of the pits 60 are chosen so that the reflected signal obtained upon traversing these pits 60 will have a peak value dependent upon the quality of focusing of the incident beam. This may be achieved, for example, by choosing the diameter of each pit 60 so that it is equal to the diameter of a properly focused beam. Then, if the incident beam is larger than the thickness of a pit 60 because of improper focusing, the reflected beam will have reduced power when each pit 60 is traversed, since only a portion of the beam will be reflected. It will also be understood that the spacing between the pits 60 along with the disk rotating speed determine the frequency at which the reflected beam is modulated when traversing the pits 60.

Referring again to FIG. 6, it will be understood that the read-after-write beam 14a applied to the preamplifier 71 during the period that the focusing pits 60 are being traversed contains the resulting focusing information. Accordingly, a peak detector 64, which is enabled by timing signal 75c during the period that the read-after-write beam is traversing the focusing pits 60, is provided to receive the amplified read-after-write beam at the output of the preamplifier 71. The peak detector 64 is adapted to respond to the magnitude of the applied signal within a frequency range determined by the spacing of the pits 60 to produce a relatively high gain output signal 64a which is a measure of the quality of focusing.

The output signal 64a from the peak detector 64 is applied to a signal adder 66 along with the signal 14c provided by the optical focus detector 47 in FIG. 3. The signal adder 66 appropriately combines these two signals 14c and 64a to produce the resulting signal 21d shown in FIG. 1 which is applied to the focusing motor 46 for maintaining precise focusing of the incident laser beams on the disk.

The purpose of providing a signal 21d to the focusing motor 46 comprised of the signal 14c from the geometric optical focus detector 47 and the signal 64a from the peak detector 64 will now be further considered. It will be understood that the signal 14c obtained from the geometric optical focus detector 47 in FIG. 3 provides only a relatively low gain control of the focusing distance which, while providing a wide capture range, typically results in producing a static or low frequency offset error. In accordance with the present invention, as exemplified in FIG. 5, a significantly more precise and offset free focus signal 21d is achieved by combining the geometric optical detector signal 14c with the peak-detected signal 64a derived from the focusing holes 60 which is capable of providing a relatively high gain. Of course, as also applies to the track following pits 56 and 58, the header 51 is repeated a sufficient number of times around each circumferential track 17 to obtain the desired precise and fast-acting control of focusing as well as of track following.

Continuing with the description of the header 51 shown in FIG. 5, the above described focusing pits 60 are followed by pits 72 recorded so as to provide an identification of the particular track and sector being traversed by the laser beams. In other words, the pits 72 represent a track and sector address and conventional encoding can be employed for this purpose, such as is used for identifying tracks and sectors on magnetic disks.

As shown in FIG. 6, the amplified read-after-write signal at the output of the preamplifier 71 is applied along with an appropriate enabling timing signal 75d to a track and sector decoder 78 which provides track and sector signals 20a and 20b respectively (see also FIG. 1) indicating the track and sector being traversed by the laser beams. The track signal 20b is also applied to track selection circuitry 80 along with a track command signal 80a indicative of a selected track to which it is desired that the laser beams be positioned. The track selection circuitry 80 compares the track indicated by the track signal 20b with the track requested by the track command signal 80a and in response thereto produces the signal 21b which is applied to the linear motor 48 in FIG. 3 to center the laser beams over the selected track.

Referring to FIG. 4 along with FIG. 5, it will be understood that, in the exemplary header 51 illustrated, the pits 72 which provide track and sector address identification are the last portion of the header 51. As pointed out previously, the resulting disk containing these headers is considered to be preformatted. Such preformatted disks will typically be provided to users who will make use of the preformatted headers in conjunction with signal processing electronics 20 such as illustrated in FIG. 6 for recording and reading data in the data recording portion 52 of each track 17 in each sector 19.

The amplified read-after-write signal provided at the output of the preamplifier 71 in FIG. 6 is also used for reading data from the data recording portion 51 of each sector 19 (FIGS. 4 and 5). Accordingly, the implementation of FIG. 6 includes data read circuitry 82 to which the output of the preamplifier 71 is applied for providing a data output signal 20a (see also FIG. 1) corresponding to the recorded digital data. The data read circuitry 82 is enabled during the time period that the read-after-write beam is traversing the data portion 52 (FIG. 4) of each sector 19 by the timing signal 75e. The resulting data output signal 20a read from the disk 15 is applied to an appropriate utilization device (not shown) along with the track and sector signals 20b and 20c which identify the track and sector from which data is read.

The data output signal 20a is also used during data recording to check that data is accurately being recorded. For this purpose FIG. 6 includes a data comparator 83 which receives both the data output signal 20a and the encoded data signal 10a from the recording circuitry 10. The data comparator 83 operates to compare the encoded data 10a with the corresponding data 20a read from the disk 15. If the comparator detects an error in the signals 10a and 20a, then the recording error interrupt signal 21f is produced which is applied to the recording circuitry 10 to interrupt recording.

It will be appreciated that the density of recording made possible by the present invention is quite high. Thus, the possibility exists that an error in positioning of the laser beams may arise during recording which could result in destroying previously recorded data. Such previously recorded data can be very expensive to replace, if not lost forever if there is no back-up. This problem is prevented by making use of the read-before-write beam 12c.

As illustrated in FIG. 6, the read-before-write signal 14b obtained from the optical detection circuitry 49 in FIG. 3 is applied to a preamplifier 91 whose output 91a is in turn applied to a data detector 95 via filter circuitry 93. The filter circuitry 93 is provided to prevent noise from interfering with the operation of the data detector 95. The data detector 95 is responsive to the presence of recorded data to produce an interrupt signal 95a which is applied to the recording circuitry 10 (FIG. 1) to halt recording, thereby protecting previously recorded data. It is to be understood that the read-before-write beam may also be used for other purposes, such as to check the quality of the track prior to recording, or to provide more precise track following and/or focusing control.

Reference is now directed to FIGS. 8-14 which illustrate particularly advantageous embodiments of the optics and photodetector elements employed in the beam combiner and splitter 38, the optical detector circuit 49 and the optical focus detector 47 shown in FIG. 3.

Figure 8:
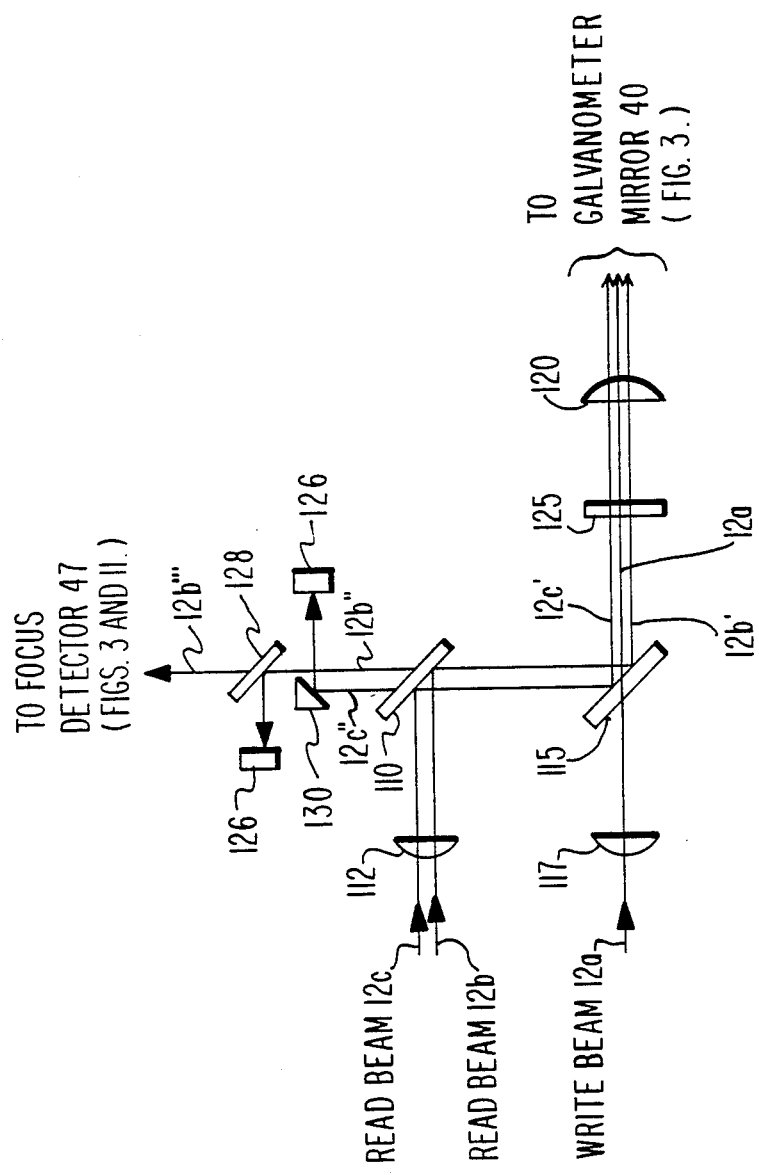
FIG. 8 is a schematic illustration showing details of the optics employed in a preferred embodiment of the beam combiner and splitter 38 shown in FIG. 1.

The write beam 12a in FIG. 8 corresponds to the write beam provided at the output of the light modulator 36 in FIG. 3, while the read beams 12b and 12c in FIG. 8 correspond to the read beams provided at the output of the beam splitter 34 in FIG. 3. The spacing of the read beams 12b and 12c is provided based on the spacing required therebetween when focused on the disk. Also, in accordance with the present invention, the beams 12a, 12b and 12c are polarized such that the write beam 12a has a polarization which is perpendicular to the polarization of the read beams 12b and 12c.

As shown in FIG. 8, the read beams 12b and 12c are applied, via a focusing lens 112, to a beam splitter 110 which is constructed and arranged to reflect the read beams 12b and 12c to a specially designed spatial combining and separating device 115. The focusing lens 112 serves to appropriately focus the read beams on the device 115. The write beam 12a is also applied to this spatial combining and separating device 115 via a focusing lens 117 which appropriately focuses the write beam 12a on the device 115. The construction, arrangement and operation of the spatial combining and separating device 115 are such as to cause the applied write beam 12a to be transmitted therethrough while the applied read beams 12b and 12c are reflected therefrom so as to produce resulting write and read beams 12a', 12b' and 12c' having appropriate spacings corresponding to those required when the beams are focused on the disk (see FIG. 2). Also, the polarization of the write beam 12a' retains its perpendicular relationship with respect to the polarization of the read beams 12b' and 12c'. The construction and operation of a preferred embodiment of the spatial combining and separating device 115 will be considered in detail later on herein with reference to FIGS. 9 and 10.

Figure 2:
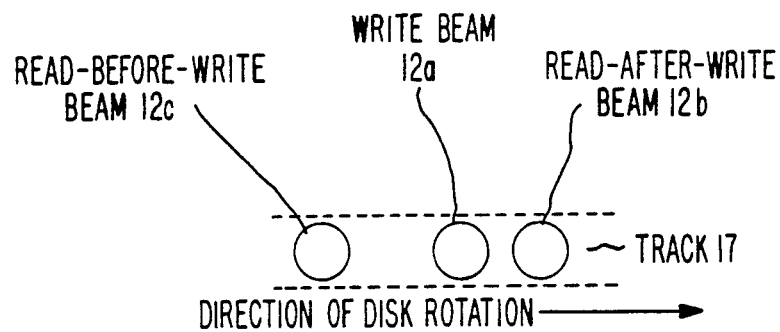
FIG. 2 illustrates the relative locations of the three laser beams provided by the system of FIG. 1 when focused on a selected track of the optical disk.

The write and read beams 12a', 12b' and 12c' from the spatial combining and separating device 115 in FIG. 8 are applied to a collimating lens 120 via a quarter wave plate 125 which produces resulting parallel read and write beams which respectively correspond to the beams 12a, 12b and 12c shown at the output of the spatial combiner and splitter 38 in FIG. 3. As previously described in connection with FIG. 3, these read and write beams are applied, via the galvanometer mirror 40 and the objective lens assembly 44, for focusing on the disk 15 (as shown in FIG. 2) with the galvanometer 42 providing for movement of the beams perpendicularly to the concentric tracks 17 (FIG. 4), as required for track following and track seeking.

It will be understood that the optics of the system are chosen such that, after reflection from the disk, the reflected read and write beams are again focused on the spatial combining and separating device 115 via the same path as followed by the transmitted beams. The returning read beams are reflected (upwardly in FIG. 8) by the spatial combining and separating device 115 to the beam splitter 110, while the returning write beam is again transmitted through the device 115 so as not to interfere with the reflected read beams. Since the reflected read beams will have made two passes through the quarter wave plate 120, they will now pass through the beam splitter 110, as indicated by read beams 12b'' and 12c'' in FIG. 8. In this regard, it is important to note that, since the polarization of the write beam is chosen to be perpendicular to the polarization of the read beams, any stray portion of the write beam that might pass to the beam splitter 110 will not pass through it and interfere with the read beam detection process to be described next. It will be understood that this feature is of considerable importance since the write beam is of significantly greater power than that of the read beams.

As indicated in FIG. 8, the reflected read beams 12b'' and 12c'' which pass through the beam splitter 110 are respectively applied to photodetectors 124 and 126. The read beam 12b'' passes to the photodetector 124 via a beam splitter 128, and the read beam 12c'' passes to the photodetector 126 via a mirror 130. The resulting outputs from these photodetectors 124 and 126 respectively correspond to the read-before-write and read-after-write outputs 14a and 14b shown in FIG. 3 from the optical detector 49.

The portion of the reflected read beam 12b'' which passes through the beam splitter 128 is designated as 12b''' in FIG. 8 and corresponds to the beam 12b applied to the optical focus detector 47 in FIG. 3. A particularly advantageous embodiment of this optical focus detector 47 will be considered in detail later on herein in connection with FIGS. 11-14.

Reference is now directed to FIGS. 9 and 10 which illustrate the construction, arrangement and operation of the spatial combining and separating device 115 in FIG. 8. The device 115 comprises a thin transparent element 150, such as glass, which may typically be of circular shape. The thickness of the element 150 is preferably made very thin so as not to introduce astigmatism. On the side of the glass element 150 at which the write beam 12a enters, there is provided a coating 152 which is chosen in a conventional manner so as to act as an anti-reflective coating at the wavelength of the write beam 12a, thereby permitting the write beam 12a to pass through the element 115 with minimum reflection.

Except for a slot area 155, the other side of the element 150 shown in FIGS. 9 and 10 is provided with a reflective dielectric coating 154 which is chosen in a conventional manner so as to act as a mirror at the wavelength of the read beams 12b and 12c (which is usually the same as the write beam wavelength). Thus, as shown in FIGS. 8 and 9, the read beams 12b and 12c applied to the device 115 will be reflected from the reflective coating 154 to become the read beams 12a' and 12b; and likewise, the returning read beams reflected from the disk will also be reflected from the reflective coating 154 of the device 115 to ultimately become the reflected read beams 12a" and 12b" from the beam splitter 110. For the sake of clarity, the read and write beams reflected from the disk are not shown in FIG. 9.

The slot area 155 (on which the read beams do not impinge) is provided with an anti-reflective dielectric coating 156 (again in a conventional manner) at the wavelength of the write beam 12a so as to permit the write beam 12a to pass out from the device 115 to become the write beam 12a' shown in FIGS. 8 and 9, and so as to also permit the returning write beam reflected from the disk to pass back through the device 115 and out from the anti-reflective coating 152 at the other side of the device 115, as described previously. The location of the slot 155 in the spatial combining and separating device 115 shown in FIGS. 9 and 10 is chosen to correspond to the appropriate location required for the write beam relative to the read beams, as shown in FIG. 2. In this regard, it is to be understood that, for proper operation of the device 115, all that is needed is that an opening of sufficient size be provided to permit the original and reflected write beams to pass therethrough without interfering with the reflection of the read beams or their proper detection. In the particular embodiment illustrated in FIGS. 9 and 10, a slot-shaped opening 155 is employed because it can be more simply and economically provided.

Reference is next directed to FIG. 11 which illustrates the construction and arrangement of a preferred embodiment of the focus detector 47 in FIG. 3 to which the beam 12b''' in FIG. 9 is applied, as mentioned previously.

As shown in FIG. 11, the focus detector 47 includes a lens 130 which collects the reflected read beam 12b''' and applies it to a collimating lens 132. The resulting parallel beam from lens 132 is applied to a beam splitter 133 which splits the beam 12b''' into the two beams 12b-1 and 12b-2 which preferably are of approximately equal intensity. The beam 12b-1 is applied to a photodetector 136 and the beam 12b-2 is applied to a photodetector 138. The resulting photodetector outputs 136a and 138a are applied to a difference amplifier 140 which in response thereto produces a focus error signal F (which corresponds to the signal 14c in FIG. 3). The construction, arrangement and locations of the photodetector elements 136 and 138 are chosen so that: (1) when the read and write beams are properly in focus on the disk, the first and second photodetector outputs 136 and 138 will be equal, in which case the focus error signal F from the difference amplifier 40 is zero; (2) when the beams are out of focus in one direction, the first photodetector output will be greater than the second photodetector output by an amount dependent upon the magnitude of the out-of-focus distance, in which case the focus error signal F will have a first polarity; and (3) when the beams are out-of-focus in the opposite direction, the second photodetector output will be greater than the first photodetector output, in which case the focus error signal F will have the opposite polarity.

Reference is now directed to FIGS. 12-14 which will be used to describe the construction, arrangement and operation of the focus detector 47 of FIG. 11. For ease of understanding, FIGS. 12-14 illustrate a functionally similar arrangement to that of FIG. 11 which, for the purpose of illustration, omits the beam splitter 133 and places the photodetectors 136 and 138 in line with the collimated beam (112a-1 or 112b-1) derived from the lens 132. The upper portion of each of FIGS. 12-14 shows the relation of each of the beams 12b-1 and 12b-2 with respect to a schematic side view of their respective photodetectors 136 and 138, while the lower portion of each of FIGS. 12-14 shows the relation of each of the beams 12a-1 and 12-b with respect to a schematic plan view of their respective photodetectors 136 and 138.

As shown in FIGS. 12-14, each of photodetectors 136 and 138 includes a photosensitive element 136a or 138a of generally rectangular shape having a slot 136b or 138b. The photodetectors 136 and 138 are located in their respective optical paths such that the incident respective beams 12b-1 and 12b-2 will be of substantially equal diameter when the beams are in proper focus on the disk. This is the situation illustrated in FIG. 12.

FIGS. 13 and 14 illustrate the effect of positive and negative out-of-focus conditions. FIG. 13 illustrates the condition for which the spacing between the objective lens assembly 44 in FIG. 3 and the optical disk 15 is greater than its in-focus distance, while FIG. 14 illustrates the condition for which the spacing between the objective lens assembly 44 and the disk 15 is less than the in-focus distance. It will be seen that for a spacing greater than the in-focus distance, as illustrated in FIG. 13, a converging, wider than normal beam is obtained from the lens 132 which results in a correspondingly wider beam being applied to the photodetector 136 and a correspondingly narrower beam being applied to the photodetector 138. On the other hand, for a spacing of the objective lens assembly from the disk which is less than the in-focus distance, as illustrated in FIG. 14, a diverging, narrower than normal beam is obtained from the lens 132 which results in a correspondingly narrower beam being applied to the photodetector 136 and a correspondingly wider beam being applied to the photodetector 138.

The operation illustrated in FIGS. 12-14 for the focus detector 47 is preferably achieved by designing the optics in accordance with the equation:

$$S_1 + S_2 = 2f_6 \left(1 + \frac{f_0 f_6}{f_3^2}\right)$$

where $f_0$ is the focal length provided by the objective lens assembly 44 in FIG. 3, $f_3$ is the focal length of the lens 120 in FIG. 11, $f_6$ is the effective focal length of lenses 130 and 132 in FIG. 11, $S_1$ is the distance between the lens 132 and the photodetector 12*b*-1, and $S_2$ is the distance between the lens 132 and the photodetector 12*b*-2. Also, it is of additional advantage to choose the width of each of the photodetector slots 136*b* and 138*b* so as to be equal to approximately one-half of the diameter of their respective beams 12*b*-1 and 12*b*-2 for the in-focus condition shown in FIG. 12.

An important advantage of providing an optical arrangement as described above is that the focus error signal F produced at the output of the difference amplifier 140 in FIG. 11 will have only one zero-crossing point which will substantially coincide with the desired in-focus condition. Additional advantages are that a high gain can be obtained in the immediate vicinity of the zero-crossing point along with a relatively wide capture range.

In order to permit proper operation in the system of FIG. 3, it is important that the size of the photosensitive elements 136*a* and 136*b* and the length of the slots 136*b* and 138*b* provided therein be chosen so as to be sufficient to accommodate the maximum excursion which could occur in the beams 12*b*-1 and 12*b*-2 as a result of the operation of the galvanometer 42 in FIG. 3.

Although the description of the invention provided herein has been directed to particular preferred embodiments, it is to be understood that many modifications in construction, arrangement, components, operation and use are possible without departing from the true scope and spirit of the present invention. The appended claims are accordingly to be considered as encompassing all such possible modifications and variations.

What is claimed is:

1. In an optical storage system including an optical storage medium, the combination comprising:
   first means for providing a writing radiation beam for producing optically detectable changes in said medium;
   second means for providing a reading radiation beam for reading said optically detectable changes as a result of changes produced in the reading beam after reflection from said medium;
   optical detection means for detecting changes in a reflected beam applied thereto; and
   third means to which said beams are applied for combining said recording and reading beams, focusing the combined beams onto predetermined areas of said medium, separating the reflected beams after reflection from said medium, and directing the separated reflected reading beam to said optical detection means;
   said third means including a polarization-insensitive spatial combining and separating device constructed, arranged and located with respect to said beams so that the original writing beam and the reflected writing beam from said medium each pass through said device without being changed in direction, while the original reading beam and the reflected reading beam from said medium are each reflected by said device and changed in direction after being reflected by said device.

2. The invention in accordance with claim 1, wherein the original writing and reading beams are directed to said device with polarizations which are substantially perpendicular to one another.

3. The invention in accordance with claim 2, wherein the writing and reading beams reflected from said medium are each directed to said device with a polarization which is rotated 90° from that of its respective original writing and reading beam directed to said device.

4. The invention in accordance with claim 3, wherein said third means operates to direct the original writing beam to said device along a first direction and to direct the original reading beam to said device along a second non-parallel direction, and wherein said device operates to transmit the original writing beam without changing its direction while causing the original reading beam to be reflected in a direction substantially parallel to said first direction with a predetermined spacing from said original writing beam.

5. The invention in accordance with claim 4, wherein said third means operates to direct the writing and reading beams reflected from said medium to said device in a direction substantially opposite to said first direction, wherein said device operates to transmit the reflected writing beam without changing its direction while causing the reflected reading beam to be reflected in a changed direction which is different from said first direction.

6. The invention in accordance with claim 5, wherein said third means is constructed and arranged so that the original writing and reading beams as well as the reflected writing and reading beams from said medium are focused on said device.

7. The invention in accordance with claim 6, wherein said device operates to cause the reflected reading beam to be reflected in a direction which is substantially opposite to said second direction.

8. The invention in accordance with claim 7, wherein said first and second directions are substantially perpendicular.

9. The invention in accordance with claim 7, wherein said third means includes polarization-sensitive means located between said detection means and said device, wherein said device directs the reflected reading beam to said polarization-sensitive means after reflection by said device, and wherein said polarization-sensitive means is constructed and arranged to pass the reflected reading beam to said detection means while not passing a beam which is polarized perpendicular thereto, thereby preventing any portion of said writing beams which may reach said polarization-sensitive means from being passed thereby to said detection means.

10. The invention in accordance with claim 9, wherein the spacing of the focused original writing and reading beams on said device is chosen in accordance with the spacing desired therebetween when focused on said medium.

11. The invention in accordance with claim 9, wherein said third means are constructed and arranged so that the reflected writing and reading beams from said medium return to said device by the same path as followed by the original writing and reading beams in traveling from said device to said medium.

12. The invention in accordance with claim 11, wherein said reading and writing beams are laserbeams.

13. The invention in accordance with claim 1, 2, 3, 4, 5, 6, 7, 8, 9, 10, 11 or 12, wherein said spatial combining and separating device comprises a thin transparent element having a reflective coating on one side with an opening in the reflective coating extending to said transparent element, the directions of said beams being chosen in conjunction with the positioning of said element so that the original and reflected writing beams pass through said device in opposite directions via said element and said opening while the original and reflected reading beams impinge on said reflective coating and are reflected thereby.

14. The invention in accordance with claim 13, wherein said element is disposed at an angle of 45° relative to the direction of application of said writing beams.

15. The invention in accordance with claim 13, wherein a coating which is anti-reflective at the wavelength of said writing beams is provided on the side of said element opposite from said reflective coating.

16. The invention in accordance with claim 15, wherein the area on the side of said element adjacent said opening through which said writing beams pass is provided with a coating which is anti-reflective at the wavelength of said writing beams.

17. The invention in accordance with claim 16, wherein said opening is a slot provided in said reflective coating.

* * * * *